United States Patent [19]

Yoshioka

[11] Patent Number: 4,989,961
[45] Date of Patent: Feb. 5, 1991

[54] PROJECTION LENS SYSTEMS FOR USE IN PROJECTION TELEVISION

[75] Inventor: Takayuki Yoshioka, Tokyo, Japan

[73] Assignee: Pioneer Electronic Corporation, Tokyo, Japan

[21] Appl. No.: 293,152

[22] Filed: Jan. 3, 1989

[30] Foreign Application Priority Data

Apr. 8, 1988 [JP] Japan ................................. 63-85155

[51] Int. Cl.$^5$ .............................................. G02B 9/62
[52] U.S. Cl. .................................... 350/464; 350/432; 350/412
[58] Field of Search ................. 350/432, 412, 463, 464

[56] References Cited

U.S. PATENT DOCUMENTS 4,682,862 7/1987 Moskovich ......................... 350/432
4,778,264 10/1988 Matsumura et al. ................ 350/412

Primary Examiner—Paul M. Dzierzynski
Attorney, Agent, or Firm—Finnegan, Henderson, Farabow, Garrett and Dunner

[57] ABSTRACT

A projection lens system including seven lens elements for use in a projection television which comprises, in order from the screen side, a first lens unit composed of a positive lens element, a second lens unit composed of an aspherical lens element made of plastic in a meniscus form having at least one aspherical surface, a third lens unit composed of a concave lens element, a fourth lens unit composed of a positive cemented lens having a convex surface on both sides, a fifth lens unit composed of a positive lens element made of plastic in meniscus form having at least one aspherical surface, and a sixth lens unit composed of a negative lens element which has a concave surface directed toward the screen, the sixth lens unit being made of a plastic lens in meniscus form having at least one aspherical surface.

11 Claims, 6 Drawing Sheets

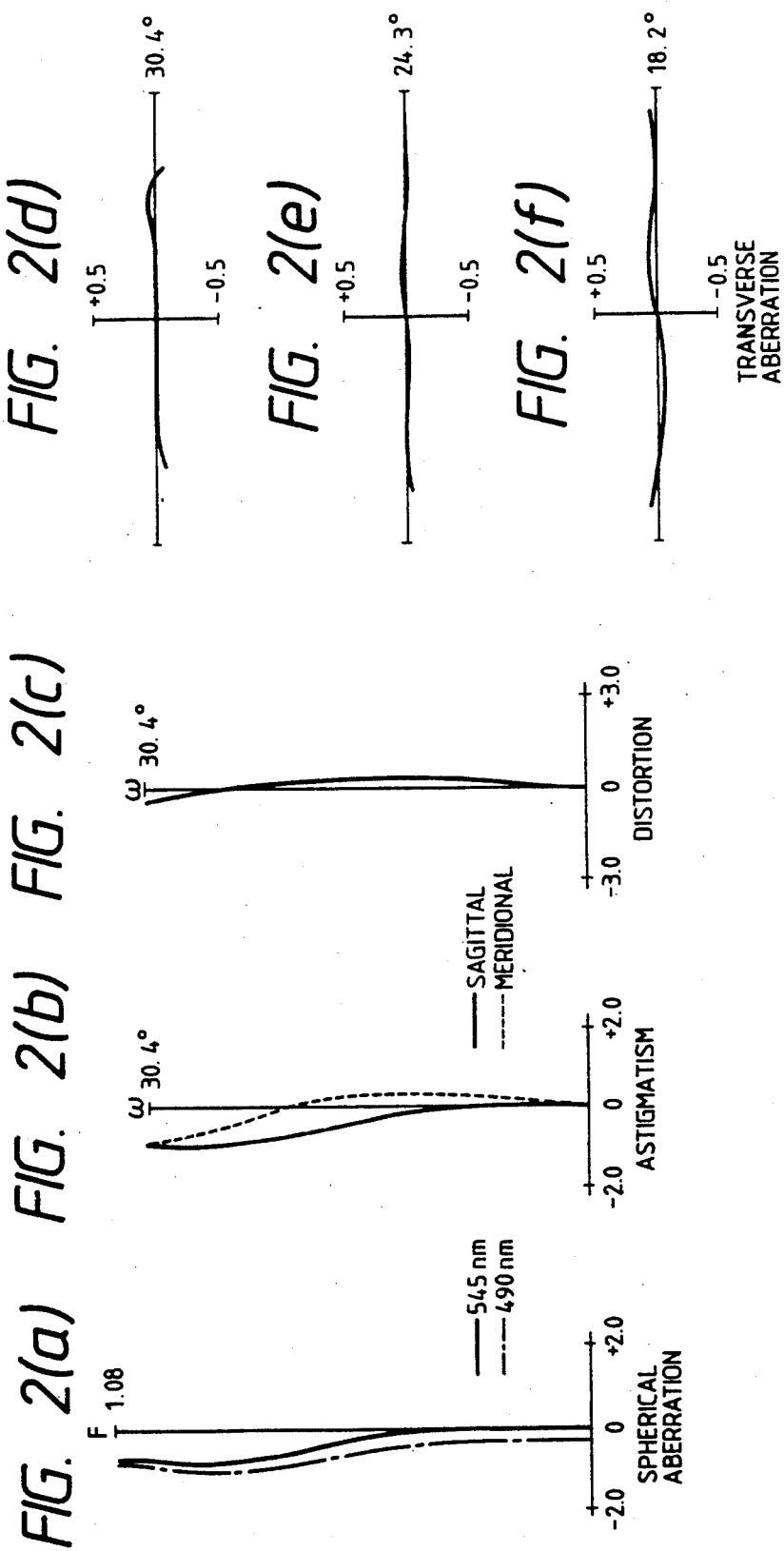

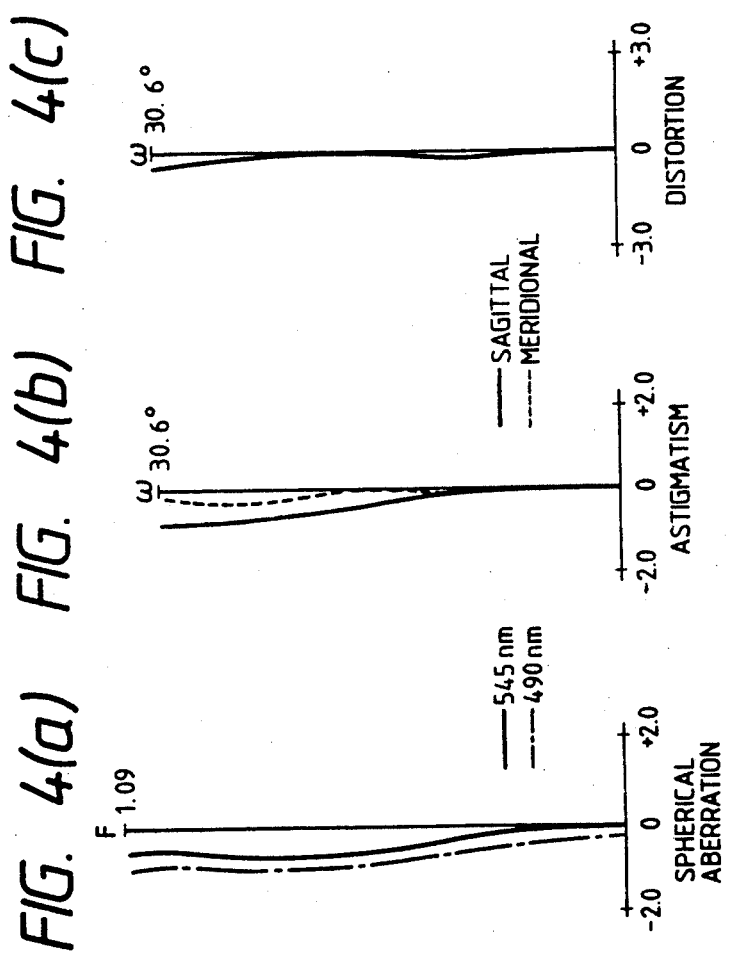

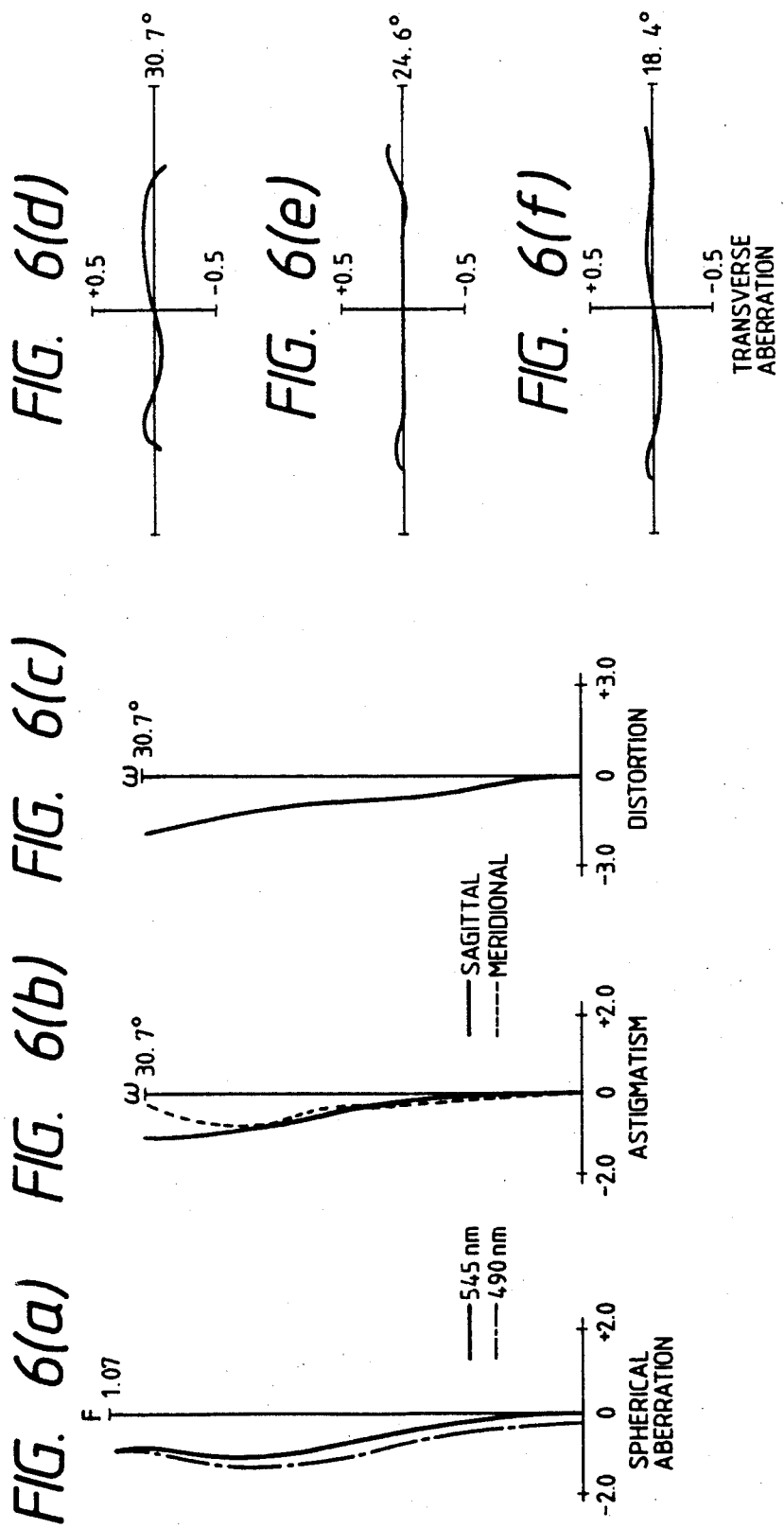

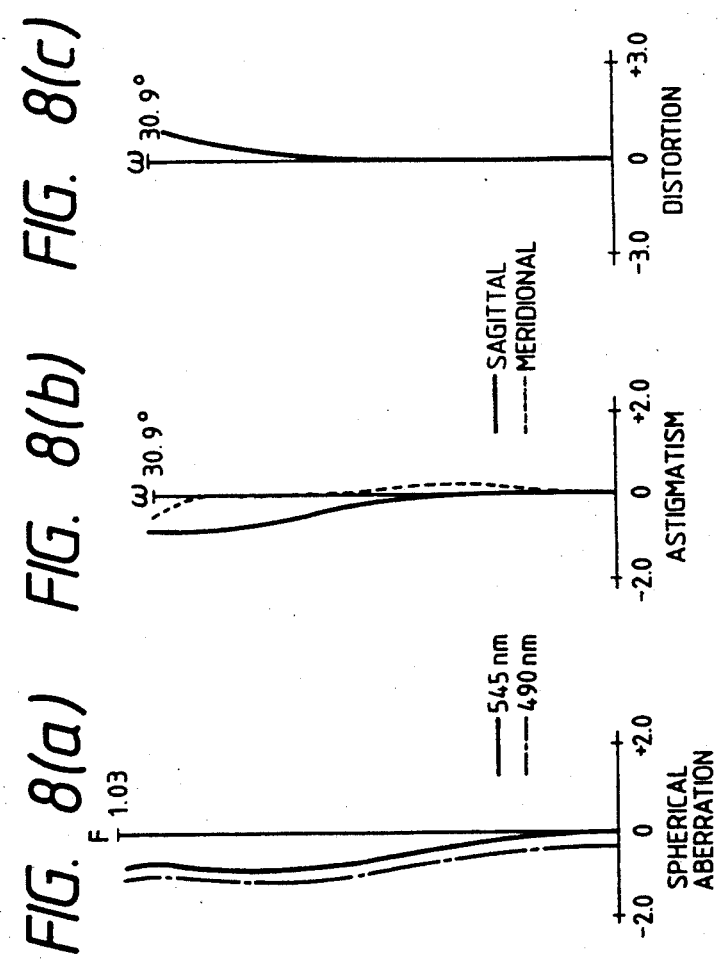

PROJECTION LENS SYSTEMS FOR USE IN PROJECTION TELEVISION

BACKGROUND OF THE INVENTION

1. Field of The Invention

The present invention relates to projection television and, more particularly, to a projection lens system useful in a projection television.

2. Description of Related Art

A projection television is a device by which images from red, green, and blue projection CRTs are projected through three associated projection lens systems onto a screen to form an enlarged color picture. In order to reduce the thickness or size of a projection television, the projection lens systems employed are required to have a large viewing angle and aperture ratio, as well as good imaging performance.

Many types of projection lens systems have been proposed for satisfying these requirements, and typical examples include: a projection lens system that is solely composed of glass lenses that can be machined with high precision to retain good quality; a system that is solely composed of plastic lenses with a view to reducing the manufacturing cost while attaining a large aperture ratio; and a hybrid system composed of glass lenses and aspherical plastic lenses.

The conventional projection lens systems have their own problems. A problem with the system that is solely composed of glass lenses is that its size and cost will be increased and its marginal performance be greatly impaired if an attempt is made to improve its imaging performance while maintaining a large aperture ratio. The system that is solely composed of plastic lenses having an aspherical surface is suitable for the purpose of attaining a large aperture ratio but the precision of machining that can be attained with plastic lenses is not as high as the value achievable with glass lenses s that this system is not capable of operating with its design performance being fully exhibited. A further problem with plastic lenses is that they experience changes in refractive index and shape in the face of temperature variations and that the resulting change in the focal position will impair their imaging performance.

It is generally held that the lenses through which images from red, green, and blue projection tubes are projected onto a screen in a projection television need not be achromatic. In practice, however, a blue projection tube produces a broad emission spectrum whereas spurious emission spectra are observed in green and red projection tubes. Therefore, non-achromatic projection lenses have a disadvantage in that the imaging performance for the three primary colors is reduced to produce a lower contrast.

SUMMARY OF THE INVENTION

An object of the present invention is a projection lens system for a projection television which overcomes the disadvantages of the prior art and that has excellent imaging performance.

Another object of the present invention is a projection lens system capable of efficient compensation for chromatic aberration while allowing a large aperture ratio and a wide viewing angle without unduly sacrificing the brightness of the edge of the image field.

A further object of the present invention is a projection lens system that employs plastic lenses in meniscus form and hence can be fabricated by molding with high precision.

Still another object of the present invention is a projection lens system that can be manufactured at a lower cost than those of the prior art.

Yet another object of the present invention is a projection lens system that maintains a large aperture ratio to ensure a large viewing angle and good imaging performance.

Additional objects and advantages of the invention will be set forth in part in the description which follows, and in part will be obvious from the descritpion, or may be learned by practice of the invention. The objects and advantages of the invention may be realized and attained by means of the instrumentalities and combinations particularly pointed out in the appended claims.

To achieve the advantages and in accordance with the purpose of the invention, as embodied and broadly described herein, the projection lens system of the present invention includes seven lens elements for use in a projection television. The seven lens elements include, in order from the screen side, a first lens unit composed of a positive lens element, a second lens unit composed of an aspherical lens element made of plastic in a meniscus form having at least one aspherical surface, a third lens unit composed of a concave lens element, a fourth lens unit composed of a positive cemented lens having a convex surface on both sides, a fifth lens unit composed of a positive lens element made of plastic in meniscus form having at least one aspherical surface, and a sixth lens unit composed of a negative lens element which has a concave surface directed toward the screen, the sixth lens unit being made of a plastic lens in meniscus form having at least one aspherical surface.

In one embodiment of the present invention, the projection lens system of the present invention satisfies the following relation:

$$0.2 < \Psi_{1,2} < 0.7$$

where $\Psi_{1,2}$ is the composite power of the first and second lens units.

In another embodiment of the present invention, the projection lens system satisfies the following relation:

$$0.2 < |\Psi_3| < 0.7$$

where $\Psi_3$ is the power of the third lens unit.

In still another embodiment of the present invention, the projection lens system satisfies the following relation when a glass lens having an Abbe number of about 60 is used as the first lens unit:

$$\nu_3 < 40$$

where $\nu_3$ is the Abbe number of the third lens unit.

In still another embodiment of the present invention, the projection lens system satisfies the following relation:

$$1.1 < \Psi_{4,5} < 1.4$$

where $\Psi_{4,5}$ is the composite power of the fourth and fifth lens units.

In yet another embodiment of the present invention, the projection lens system satisfies the following relation when the power of the overall system is unity:

$$0.9 < |\Psi_6| < 1.3$$

where $\Psi_6$ is the power of the sixth lens unit.

In another embodiment of the present invention, the second and fifth lens units of the projection lens system satisfy the following conditions:

$$-0.3 < \Psi_2 < 0.3$$

$$0.1 < \Psi_5 < 0.4$$

where
$\Psi_2$: the power of the second lens unit and
$\Psi_5$: the power of the fifth lens unit (assuming the power of the overall system as unity).

In yet another embodiment of the projection lens system of the present invention, one lens component of the fourth lens unit satisfies the following condition:

$$\nu_4' < 40$$

where $\nu_4'$ is the Abbe number of the fourth lens unit.

BRIEF DESCRIPTION OF THE DRAWINGS

FIGS. 2(a) through 2(f) are graphs plotting the aberration curves obtained with the system of Example 1;

FIGS. 4(a) through 4(f) are graphs plotting the aberration curves obtained with the system of Example 2;

FIGS. 6(a) through 6(f) are graphs plotting the aberration curves obtained with the system of Example 3;

FIGS. 8(a) through 8(f) are graphs plotting the aberration curves obtained with the system of Example 4.

DESCRIPTION OF THE PREFERRED EMBODIMENT

Figure 1:
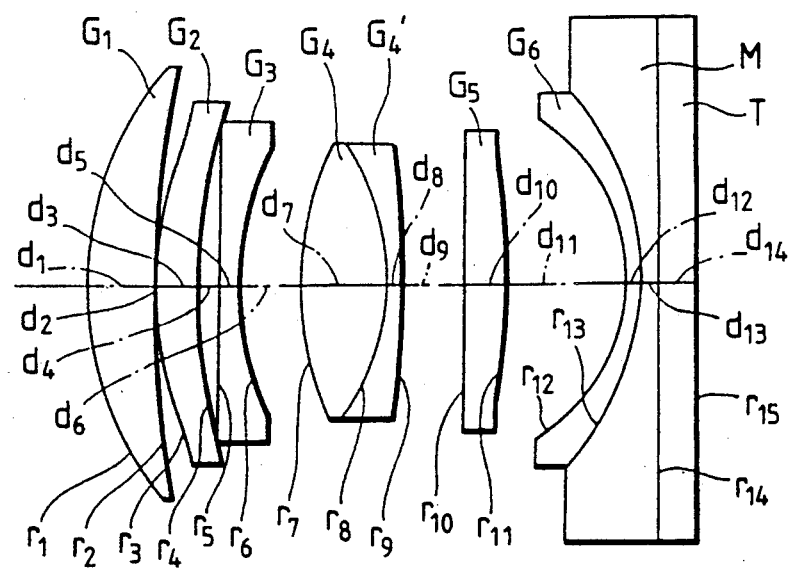
FIG. 1 is a diagrammatic cross section of a projection lens sytstem of the present invention constructed in accordance with Example 1.
Figure 3:
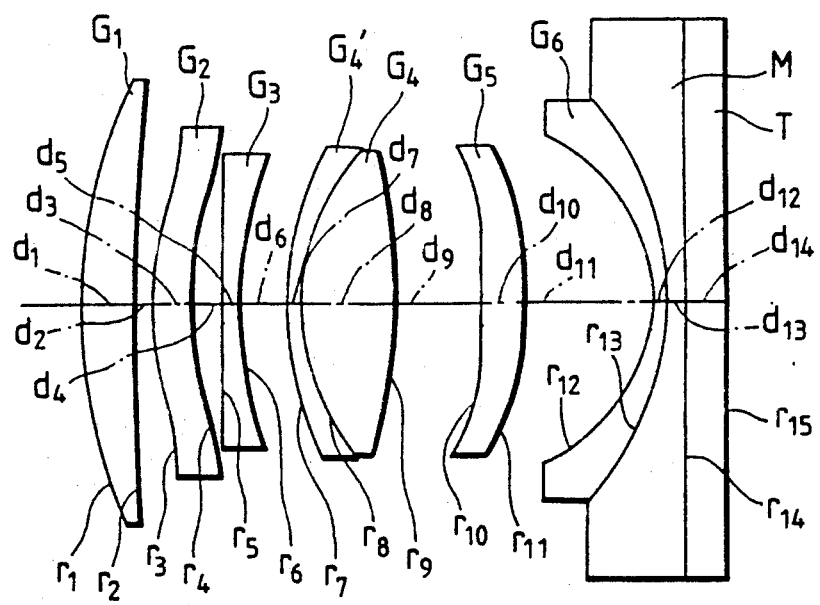
FIG. 3 is a diagrammatic cross section of a projection lens system of the present invention constructed in accordance with Example 2.
Figure 5:
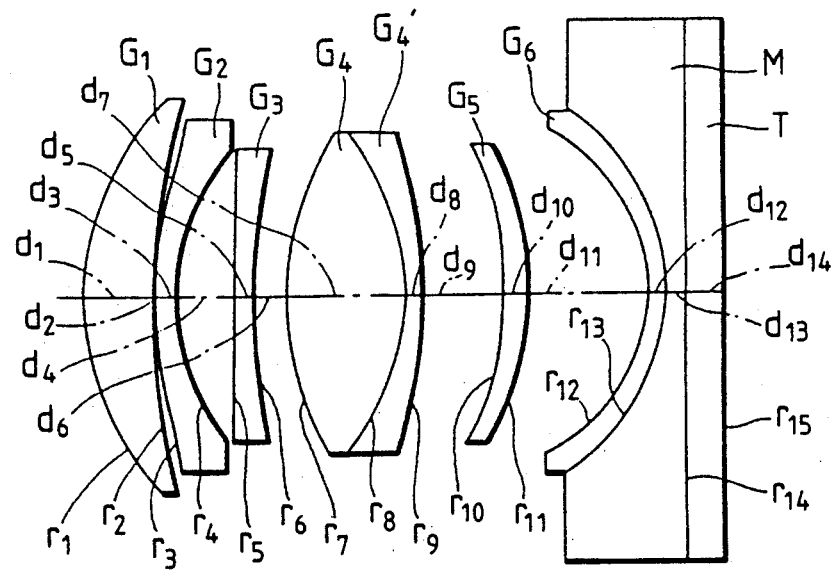
FIG. 5 is a diagrammatic cross section of a projection lens system of the present invention constructed in accordance with Example 3.
Figure 7:
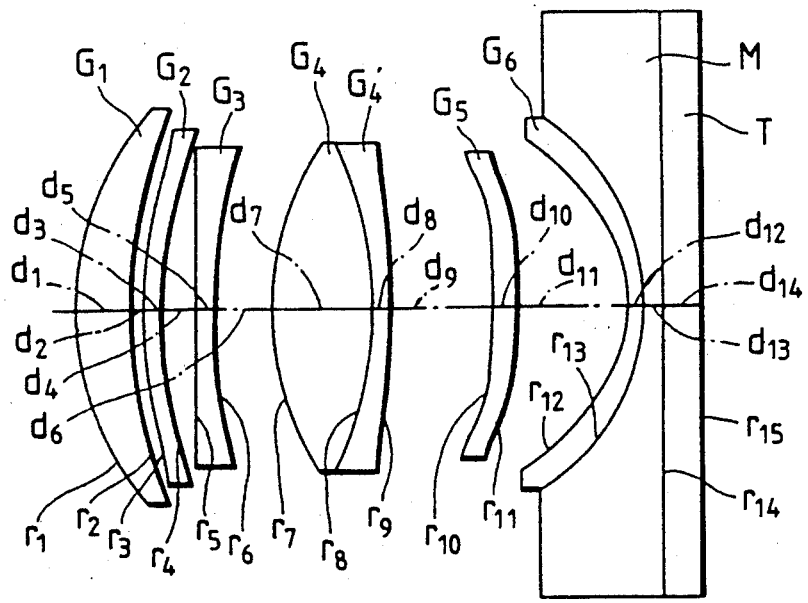
FIG. 7 is a diagrammatic cross section of a projection lens system of the present invention constructed in accordance with Example 4.

In a projection lens system for use in a projection television in accordance with the present invention, seven lens elements are provided. The seven lens elements include, in order from the screen side, a first lens unit composed of a positive lens element, a second lens unit composed of an aspherical lens element made of plastic in a meniscus form having at least one aspherical surface, a third lens unit composed of a concave lens element, a fourth lens unit composed of a positive cemented lens having a convex surface on both sides, a fifth lens unit composed of a positive lens element made of plastic in meniscus form having at least one aspherical surface, and a sixth lens unit composed of a negative lens element which has a concave surface directed toward the screen. The sixth lens unit is made of a plastic lens in meniscus form having at least one aspherical surface.

In the present invention, plastic lenses with aspherical surfaces are employed to assure good aberrational performance. Plastics useful in constructing such lenses may, for example, [IDENTIFY MATERIALS]. Those lenses in the system which have a large refractive power are made of glass so that the change that might occur in optical performance in the face of temperature variations is negligibly small. In addition, the fourth lens unit having a large refractive power is composed of a cemented lens to assure achromatism. All of the plastic lenses are in meniscus form to satisfy small thickness and good moldability requirements.

Preferably, the projection lens system of the present invention satisfies the following relation:

$$0.2 < \Psi_{1,2} < 0.7$$

where $\Psi_{1,2}$ is the composite power of the first and second lens units.

This condition relates to the composite power of the first and second lens unit. If the upper limit of this condition is exceeded, it is difficult to compensate for sagittal flare and a system having a wide viewing angle cannot be realized. If the lower limit of the condition is not reached, the overall length of the lens system will increase, leading to an unduly large and expensive projection television. In order to ensure that the overall length of the lens system will remain unchanged even if the lower limit of the condition is not reached, the powers of the fourth and fifth lens units have to be increased and this simply results in a failure to attain a balance between axial and extra-axial aberrations.

Preferably, the projection lens system satisfies the following relation:

$$0.2 < |\Psi_3| < 0.7$$

where $\Psi_3$ is the power of the third lens unit.

This condition applies to attain a balance between compensation for chromatic aberration and that for other aberrations. If the power of the third lens unit exceeds the prescribed upper limit, it becomes difficult to compensate for spherical aberration and a system having a large aperature ratio cannot be realized. If the lower limit is not reached, only insufficient compensation for chromatic aberration will result.

Preferably, the projection lens system of the present invention satisfies the following relation when a glass lens having an Abbe number of about 60 is used as the first lens unit:

$$\nu_3 < 40$$

where $\nu_3$ is the Abbe number of the third lens unit.

This condition obtains because if the Abbe number of the third lens unit is equal to or greater than 40 a particular problem arises when a common glass lens having an Abbe number of about 60 is used both as the positive lens element in the first lens unit and as the biconvex cemented lens in the fourth lens unit; namely, a balance cannot be struck between these lenses and the third lens unit and no effective compensation for chromatic aberration can be accomplished.

In still another embodiment of the present invention, the projection lens system satisfies the following relation:

$$1.1 < \Psi_{4,5} < 1.4$$

where $\Psi_{4,5}$ is the composite power of the fourth and fifth lens units.

This condition relates to the composite power of the fourth and fifth lens units. If the upper limit of this condition is exceeded, it becomes difficult to compensate for spherical aberration and a system having a large aperture ratio cannot be realized. If the lower limit of this condition is not reached, it becomes difficult to compensate for coma and a system having a wide viewing angle cannot be realized.

Preferably, the projection lens system of the present invention satisfies the following relation when the power of the overall system is unity:

$$0.9 < |\Psi^6| < 1.3$$

where $\Psi_6$ is the power of the sixth lens unit.

This condition is necessary for producing a flattened image plane. If the upper limit of this condition is exceeded, overcompensation for field curvature will result. If the lower limit of this condition is not reached, field curvature will be undercompensated.

The condition of $\nu_4' < 40$ relates to the Abbe number of the concave lens in the cemented lens serving as the fourth lens unit. Much better achromatism is realized if the cemented lens of the fourth lens unit satisfies this condition.

The ability of the systems of the present invention to resist temperature changes for retaining good optical performance can be further improved by allowing the second and fifth lens units to satisfy the following two conditions when the power of the overall system is unity:

$$-0.3 < {}_2\Psi < 0.3; \text{ and}$$

$$0.1 < {}_5\Psi < 0.4$$

where
$\Psi_2$ is the power of the second lens unit, and
$\Psi_5$ is the power of the fifth lens unit.

The foregoing conditions applying to the second and fifth lenses relate to the powers of the second and fifth lens units, respectively. If the upper limit of each condition is exceeded, the optical performance of each lens changes adversely in the face of temperature changes and the thickness of its central portion will increase. In addition, a difference in thickness will develop between the central portion of the lens and its periphery, leading to impaired lens moldability. If the lower limit of each condition is not reached, it becomes necessary to increase the powers of the first and fourth lens unit and the resulting difficulty in compensation for spherical aberration will be an obstacle to the purpose of realizing a system of large aperture ratio.

EXAMPLES

In Examples 1-4 which follow, $G_1$-$G_3$ refers to the first to third lens units; $G_4$, $G_4'$ refers to the fourth lens unit; $G_5$ refers to the fifth lens unit; $G_6$ refers to the sixth lens unit; M designates a filler medium; and T refers to a faceplate of a projection tube.

In each example described below, the first lens unit $G_1$, the third lens unit $G_3$ and the cemented lenses $G_4$ and $G_4'$ of the fourth lens unit are all glass lenses, whereas the second lens unit $G_2$, the fifth lens unit $G_5$ and the sixth lens unit $G_6$ are all plastic lenses. In each example, the fourteenth surface is the surface of the faceplate T of a projection tube, and the fifteenth surface as its fluorescent screen. A liquid or gel-type filler medium M is confined between the faceplate T and the sixth lens unit $G_6$ for the purpose of preventing the occurrence of a drop in contrast due to surface reflection or an elevation in the surface temperature of the projection tube.

In the data sheets to be set forth below, $r_1, r_2, \ldots, r_{15}$ signify the paraxial curvature radii of individual lenses and the faceplate of the projection tube; $d_1, d_2, \ldots, d_{14}$ denote the distance between individual surfaces; $N_{d1}, N_{d2}, \ldots, N_{d14}$ signify refractive indices at the d-line; and $\nu_{\alpha 1}, \nu_{\alpha 3}, \ldots, \nu_{\alpha 14}$ are Abbe numbers at the d-line.

Assuming, as the case of common aspherical lenses, an orthogonal coordinate system O-xyz, with the optical axis as the z-coordinate axis, the aspherical surface to be introduced in the system of the present invention is a surface of rotation symmetry as expressed by:

$$Z = \frac{H2/r}{1 + \sqrt{1 - (K + 1)(H/r)^2}} +$$

$$A_4 H^4 + A_6 H^6 + A_8 H^8 + A_{10} H^{10}$$

$$H = \sqrt{x^2 + Y^2}$$

where r is the paraxial curvature radius of the apex, K is a cone constant, and $A_4$, $A_6$, $A_8$ and $A_{10}$ are high-degree coefficients of asphericity.

In the Examples that follow, all values of curvature radius and gap length are in millimeters.

EXAMPLE 1

Focal Length=95.4 mm, Magnification −0.107
Aperture ratio=1:1.08

$\Psi_{1,2} = 0.66$, $\Psi_2 = 0.23$,
$|\Psi_3| = 0.71$,
$\Psi_{4,5} = 1.23$, $\Psi_5 = 0.27$,
$|\Psi_6| = 0.98$,

| | | | |
|---|---|---|---|
| $r_1 = 95.87$ | $d_1 = 18.77$ | $N_{d1} = 1.589$ | $\nu_{d1} = 61.3$ |
| $r_2 = 348.90$ | $d_2 = 0.50$ | $N_{d2} = 1.000$ | |
| $r_3 = 92.34$ | $d_3 = 11.00$ | $N_{d3} = 1.490$ | $\nu_{d3} = 58.2$ |
| $r_4 = 161.02$ | $d_4 = 6.07$ | $N_{d4} = 1.000$ | |
| $r_5 = 1651.22$ | $d_5 = 5.00$ | $N_{d5} = 1.620$ | $\nu_{d5} = 36.3$ |
| $r_6 = 79.23$ | $d_6 = 18.01$ | $N_{d6} = 1.000$ | |
| $r_7 = 85.84$ | $d_7 = 25.00$ | $N_{d7} = 1.697$ | $\nu_{d7} = 55.5$ |
| $r_8 = -63.85$ | $d_8 = 4.00$ | $N_{d8} = 1.620$ | $\nu_{d8} = 36.3$ |
| $r_9 = -245.24$ | $d_9 = 17.96$ | $N_{d9} = 1.000$ | |
| $r_{10} = -1124.63$ | $d_{10} = 11.00$ | $N_{d10} = 1.490$ | $\nu_{d10} = 58.0$ |
| $r_{11} = -150.31$ | $d_{11} = 34.00$ | $N_{d11} = 1.000$ | |
| $r_{12} = -44.37$ | $d_{12} = 4.00$ | $N_{d12} = 1.489$ | $\nu_{d12} = 58.2$ |
| $r_{13} = -70.00$ | $d_{13} = 4.70$ | $N_{d13} = 1.437$ | $\nu_{d13} = 63.8$ |
| $r_{14} = \infty$ | $d_{14} = 11.33$ | $N_{d14} = 1.540$ | $\nu_{d14} = 55.0$ |
| $r_{15} = \infty$ | | | |

$r_3$: aspherical surface    $r_{11}$: aspherical surface
k:   0.0000                    0.0000
$A_4$:  $-0.4271 \times 10^{-6}$    $0.4608 \times 10^{-6}$
$A_6$:  $0.2627 \times 10^{-10}$    $0.3594 \times 10^{-9}$
$A_8$:  $-0.8761 \times 10^{-13}$   $-0.2093 \times 10^{-12}$
$A_{10}$: $0.1308 \times 10^{-16}$   $0.1256 \times 10^{-15}$ $r_{12}$: aspherical surface  $r_{13}$: aspherical surface
k:   $-1.0000$                   $-0.5000$
$A_4$:  $-0.6849 \times 10^{-6}$    0.0000
$A_6$:  $0.5611 \times 10^{-9}$     0.0000
$A_8$:  $-0.4159 \times 10^{-12}$   0.0000

-continued

| | | |
|---|---|---|
| $A_{10}$: | $0.7521 \times 10^{-16}$ | 0.0000 |

EXAMPLE 2

Focal Length=93.8 mm, Magnification −0.107
Aperture ratio=1:1.09

$\Psi 1,2 = 0.42, \Psi 2 = 0.07,$
$|\Psi 3| = 0.54,$
$\Psi 4,5 = 1.28, \Psi 5 = 0.27,$
$|\Psi 6| = 1.22,$ $r_1 = 133.92$
  $d_1 = 14.70$  $N_{d1} = 1.606$  $\nu_{d1} = 51.4$
$r_2 = 693.10$
  $d_2 = 4.69$  $N_{d2} = 1.000$
$r_3 = 78.63$
  $d_3 = 10.00$  $N_{d3} = 1.490$  $\nu_{d3} = 58.2$
$r_4 = 84.88$
  $d_4 = 7.91$  $N_{d4} = 1.000$
$r_5 = 845.26$
  $d_5 = 5.00$  $N_{d5} = 1.717$  $\nu_{d5} = 29.5$
$r_6 = 109.23$
  $d_6 = 11.87$  $N_{d6} = 1.000$
$r_7 = 83.66$
  $d_7 = 4.00$  $N_{d7} = 1.717$  $\nu_{d7} = 29.5$
$r_8 = 59.04$
  $d_8 = 25.00$  $N_{d8} = 1.697$  $\nu_{d8} = 55.5$
$r_9 = -146.65$
  $d_9 = 23.13$  $N_{d9} = 1.000$
$r_{10} = -421.32$
  $d_{10} = 11.00$  $N_{d10} = 1.490$  $\nu_{d10} = 58.0$
$r_{11} = -121.03$
  $d_{11} = 34.00$  $N_{d11} = 1.000$
$r_{12} = -35.59$
  $d_{12} = 4.00$  $N_{d12} = 1.489$  $\nu_{d12} = 58.2$
$r_{13} = -70.00$
  $d_{13} = 4.70$  $N_{d13} = 1.437$  $\nu_{d13} = 63.8$
$r_{14} = \infty$
  $d_{14} = 10.30$  $N_{d14} = 1.540$  $\nu_{d14} = 55.0$
$r_{15} = \infty$

| | $r_3$: aspherical surface | $r_4$: aspherical surface |
|---|---|---|
| k: | 0.0000 | 0.0000 |
| $A_4$: | $-0.7876 \times 10^{-6}$ | $-0.4768 \times 10^{-6}$ |
| $A_6$: | $-0.5155 \times 10^{-9}$ | $-0.4809 \times 10^{-9}$ |
| $A_8$: | $-0.6676 \times 10^{-13}$ | $-0.3521 \times 10^{-13}$ |
| $A_{10}$: | $0.4619 \times 10^{-16}$ | $0.6055 \times 10^{-16}$ |
| | $r_{10}$: aspherical surface | $r_{11}$: aspherical surface |
| k: | 0.0000 | 0.0000 |
| $A_4$: | $-0.8878 \times 10^{-6}$ | $-0.4481 \times 10^{-6}$ |
| $A_6$: | $-0.6168 \times 10^{-9}$ | $-0.1800 \times 10^{-9}$ |
| $A_8$: | $0.1724 \times 10^{-13}$ | $0.3356 \times 10^{-12}$ |
| $A_{10}$: | $0.5610 \times 10^{-16}$ | $0.1390 \times 10^{-15}$ |
| | $r_{12}$: aspherical surface | $r_{13}$: aspherical surface |
| k | −1.0000 | −0.5000 |
| $A_4$: | $0.1212 \times 10^{-5}$ | 0.0000 |
| $A_6$: | $-0.2010 \times 10^{-8}$ | 0.0000 |
| $A_8$: | $0.9898 \times 10^{-12}$ | 0.0000 |
| $A_{10}$: | $-0.2475 \times 10^{-15}$ | 0.0000 |

EXAMPLE 3

Focal Length=92.2 mm, Magnification −0.105
Aperture ratio=1:1.07

$\Psi 1,2 = 0.27, \Psi 2 = 0.28,$
$|\Psi 3| = 0.34,$
$\Psi 4,5 = 1.30, \Psi 5 = 0.18,$
$|\Psi 6| = 1.17,$ $r_1 = 71.64$
  $d_1 = 18.31$  $N_{d1} = 1.589$  $\nu_{d1} = 61.3$
$r_2 = 197.89$
  $d_2 = 0.50$  $N_{d2} = 1.000$
$r_3 = 91.11$
  $d_3 = 5.00$  $N_{d3} = 1.490$  $\nu_{d3} = 58.2$
$r_4 = 56.97$
  $d_4 = 14.89$  $N_{d4} = 1.000$
$r_5 = 1033.96$
  $d_5 = 5.00$  $N_{d5} = 1.717$  $\nu_{d5} = 29.5$
$r_6 = 163.63$
  $d_6 = 9.09$  $N_{d6} = 1.000$
$r_7 = 77.55$
  $d_7 = 31.00$  $N_{d7} = 1.697$  $\nu_{d7} = 55.5$
$r_8 = -60.38$
  $d_8 = 4.00$  $N_{d8} = 1.717$  $\nu_{d8} = 29.5$
$r_9 = -127.82$
  $d_9 = 20.51$  $N_{d9} = 1.000$
$r_{10} = -157.39$
  $d_{10} = 6.00$  $N_{d10} = 1.490$  $\nu_{d10} = 58.0$
$r_{11} = -98.17$
  $d_{11} = 32.00$  $N_{d11} = 1.000$
$r_{12} = -35.80$
  $d_{12} = 4.00$  $N_{d12} = 1.489$  $\nu_{d12} = 58.2$
$r_{13} = -55.00$
  $d_{13} = 4.70$  $N_{d13} = 1.437$  $\nu_{d13} = 63.8$
$r_{14} = \infty$
  $d_{14} = 10.30$  $N_{d14} = 1.540$  $\nu_{d14} = 55.0$
$r_{15} = \infty$

| | $r_3$: aspherical surface | $r_{10}$: aspherical surface |
|---|---|---|
| k: | 0.0000 | 0.0000 |
| $A_4$: | $-0.6309 \times 10^{-6}$ | $-0.2397 \times 10^{-9}$ |
| $A_6$: | $-0.1819 \times 10^{-5}$ | $0.1167 \times 10^{-8}$ |
| $A_8$: | $-0.1288 \times 10^{-5}$ | $0.1605 \times 10^{-8}$ |
| $A_{10}$: | $0.1539 \times 10^{-5}$ | $-0.2721 \times 10^{-8}$ |
| | $r_{11}$: aspherical surface | $r_{12}$: aspherical surface |
| k: | 0.0000 | −1.0000 |
| $A_4$: | $0.7099 \times 10^{-14}$ | $0.3673 \times 10^{-17}$ |
| $A_6$: | $-0.2795 \times 10^{-11}$ | $0.1352 \times 10^{-14}$ |
| $A_8$: | $-0.2790 \times 10^{-11}$ | $0.1349 \times 10^{-14}$ |
| $A_{10}$: | $0.1437 \times 10^{-11}$ | $-0.4243 \times 10^{-15}$ |

EXAMPLE 4

Focal Length=91.7 mm, Magnification=−0.105
Aperture ratio=1:1.03

$\Psi 1,2 = 0.43, \Psi 2 = 0.08,$
$|\Psi 3| = 0.41,$
$\Psi 4,5 = 1.18, \Psi 5 = 0.18,$
$|\Psi 6| = 1.13,$ $r_1 = 73.26$
  $d_1 = 13.57$  $N_{d1} = 1.589$  $\nu_{d1} = 61.3$
$r_2 = 127.47$
  $d_2 = 3.38$  $N_{d2} = 1.000$
$r_3 = 101.44$
  $d_3 = 5.00$  $N_{d3} = 1.490$  $\nu_{d3} = 58.2$
$r_4 = 122.79$
  $d_4 = 7.65$  $N_{d4} = 1.000$
$r_5 = 828.00$
  $d_5 = 5.00$  $N_{d5} = 1.717$  $\nu_{d5} = 29.5$
$r_6 = 135.70$
  $d_6 = 14.52$  $N_{d6} = 1.000$
$r_7 = 75.40$
  $d_7 = 25.67$  $N_{d7} = 1.697$  $\nu_{d7} = 55.5$
$r_8 = -92.39$
  $d_8 = 4.00$  $N_{d8} = 1.717$  $\nu_{d8} = 29.5$
$r_9 = -211.69$
  $d_9 = 25.52$  $N_{d9} = 1.000$
$r_{10} = -3302.63$
  $d_{10} = 6.00$  $N_{d10} = 1.490$  $\nu_{d10} = 58.0$
$r_{11} = -228.92$
  $d_{11} = 28.00$  $N_{d11} = 1.000$
$r_{12} = -36.93$
  $d_{12} = 4.00$  $N_{d12} = 1.489$  $\nu_{d12} = 58.2$
$r_{13} = -55.00$
  $d_{13} = 4.70$  $N_{d13} = 1.437$  $\nu_{d13} = 63.8$
$r_{14} = \infty$
  $d_{14} = 10.30$  $N_{d14} = 1.540$  $\nu_{d14} = 55.0$
$r_{15} = \infty$

| | $r_3$: aspherical surface | $r_{10}$: aspherical surface |
|---|---|---|
| k: | 0.0000 | 0.0000 |
| $A_4$: | $-0.5089 \times 10^{-6}$ | $-0.1273 \times 10^{-9}$ |
| $A_6$: | $-0.2598 \times 10^{-5}$ | $-0.8189 \times 10^{-9}$ |
| $A_8$: | $-0.1504 \times 10^{-5}$ | $-0.9033 \times 10^{-9}$ |
| $A_{10}$: | $0.7593 \times 10^{-6}$ | $-0.1745 \times 10^{-8}$ |
| | $r_{11}$: aspherical surface | $r_{12}$: aspherical surface |

-continued

| k | 0.0000 | −1.0000 |
|---|---|---|
| $A_4$: | $0.2537 \times 10^{-13}$ | $0.7044 \times 10^{-17}$ |
| $A_6$: | $-0.1981 \times 10^{-11}$ | $0.1530 \times 10^{-14}$ |
| $A_8$: | $-0.1314 \times 10^{-11}$ | $0.1252 \times 10^{-14}$ |
| $A_{10}$: | $0.7887 \times 10^{-12}$ | $-0.1996 \times 10^{-15}$ |

FIGS. 2, 4, 6 and 8 are graphs plotting the aberration curves obtained with the projection lens systems constructed in Examples 1–4, respectively. As these graphs show, the projection lens system of the present invention for use in a projection television maintains a larger aperture ration (F number=1.03–1.09) and yet ensures improved imaging performance at a wide viewing angle with efficient compensation.

It will be apparent to those skilled in the art that various modifications and variations can be made in the projection lens system of the present invention without departing from the scope or spirit of the invention. Thus, it is intended that the present invention cover the modifications and variations of this invention provided they come within the scope of the appended claims and their equivalents.

What is claimed is:

1. A projection lens system including seven lens elements for use in a projection television having a screen which comprises in order from the screen side:
   a first lens unit composed of a positive lens element;
   a second lens unit composed of an aspherical lens element made of plastic in a meniscus form having at least one aspherical surface;
   a third lens unit composed of a concave lens element;
   a fourth lens unit composed of a positive cemented lens doublet having a convex surface on both sides;
   a fifth lens unit composed of a positive lens element made of plastic substantially in meniscus form having at least one aspherical surface; and
   a sixth lens unit composed of a negative lens element which has a concave surface directed toward the screen, the sixth lens unit being made of a plastic lens substantially in meniscus form having at least one aspherical surface wherein the system satisfies the following relation:

$$0.2 < \Psi_{1,2} < 0.7$$

where $\Psi_{1,2}$ is the composite power of the first and second lens units.

2. A projection system as recited in claim 1 which satisfies the following relation:

$$0.2 < |\Psi_3| < 0.7$$

where $\Psi_3$ is the power of the third lens unit.

3. A projection lens system as recited in claim 2 which satisfies the following relation:

$$\nu_3 < 40$$

where $\nu_3$ is the Abbe number of the third lens unit.

4. A projection lens system as recited in claim 3 which satisfies the following relation:

$$1.1 < \Psi_{4,5} < 1.4$$

where $\Psi_{4,5}$ is the composite power of the fourth and fifth lens units.

5. A projection lens system as recited in claim 4 which satisfies the following relation when the power of the overall system is unity:

$$0.9 < |\Psi_6| < 1.3$$

where $\Psi_6$ is the power of the sixth lens unit.

6. A projection lens system for use in a projection television having a screen which comprises in order from the screen side:
   a first lens unit composed of a positive lens element;
   a second lens unit composed of an aspherical lens element made of plastic in a meniscus form having at least one aspherical surface;
   a third lens unit composed of a concave lens element;
   a fourth lens unit composed of a positive cemented lens doublet having a convex surface on both sides;
   a fifth lens unit composed of a positive lens element made of plastic substantially in meniscus form having at least one aspherical surface; and
   a sixth lens unit composed of a negative lens element which has a concave surface directed toward the screen, the sixth lens unit being made of a plastic lens substantially in meniscus form having at least one aspherical surface wherein said second and fifth lens units satisfy the following conditions when the power of the overall system is unit:

$$-0.3 < \Psi_2 < 0.3; \text{ and}$$

$$0.1 < \Psi_5 < 0.4$$

where
   $\Psi_2$ is the power of the second lens unit, and
   $\Psi_5$ is the power of the fifth lens unit.

7. A projection lens system including seven lens elements for use in a projection television having a screen which comprises in order from the screen side:
   a first lens unit composed of a positive lens element;
   a second lens unit composed of an aspherical lens element made of plastic in a meniscus form having at least one aspherical surface;
   a third lens units composed of a concave lens element;
   a fourth lens unit composed of a positive cemented lens doublet having a convex surface on both sides;
   a fifth lens unit composed of a positive lens element made of plastic substantially in meniscus form having at least one aspherical surface; and
   a sixth lens unit composed of a negative lens element which has a concave surface directed toward the screen, the sixth lens unit being made of a plastic lens substantially in meniscus form having at least one aspherical surface wherein one component of the fourth lens unit satisfies the following condition:

$$\nu_4 < 40$$

where
   $\nu_4$ is the Abbe number of the component of the fourth lens unit.

8. A projection lens system including seven lens elements for use in a projection television having a screen which comprises in order from the screen side:
   a first lens unit composed of a positive lens element;
   a second lens units composed of an aspherical lens element made of plastic in a meniscus form having at least one aspherical surface;

a third lens unit composed of a concave lens element;
a fourth lens unit composed of a positive cemented lens doublet having a convex surface on both sides;
a fifth lens unit composed of a positive lens element made of plastic substantially in meniscus form having at least one aspherical surface; and
a sixth lens unit composed of a negative lens element which has a concave surface directed toward the screen, the sixth lens unit being made of a plastic lens substantially in meniscus form having at least one aspherical surface, wherein the system has the following numerical data:

Focal Length=95.4 mm, Magnification −0.107
Aperture ratio=1:1.08

$\Psi_{1,2} = 0.66$, $\Psi_2 = 0.23$,
$|\Psi_3| = 0.71$,
$\Psi_{4,5} = 1.23$, $\Psi_5 = 0.27$,
$|\Psi_6| = 0.98$,

| | | | |
|---|---|---|---|
| $r_1 = 95.87$ | | | |
| | $d_1 = 18.77$ | $N_{d1} = 1.589$ | $\nu_{d1} = 61.3$ |
| $r_2 = 348.90$ | | | |
| | $d_2 = 0.50$ | $N_{d2} = 1.000$ | |
| $r_3 = 92.34$ | | | |
| | $d_3 = 11.00$ | $N_{d3} = 1.490$ | $\nu_{d3} = 58.2$ |
| $r_4 = 161.02$ | | | |
| | $d_4 = 6.07$ | $N_{d4} = 1.000$ | |
| $r_5 = 1651.22$ | | | |
| | $d_5 = 5.00$ | $N_5 = 1.620$ | $\nu_{d5} = 36.3$ |
| $r_6 = 79.23$ | | | |
| | $d_6 = 18.01$ | $N_{d6} = 1.000$ | |
| $r_7 = 85.84$ | | | |
| | $d_7 = 25.00$ | $N_{d7} = 1.697$ | $\nu_{d7} = 55.5$ |
| $r_8 = -63.85$ | | | |
| | $d_8 = 4.00$ | $N_{d8} = 1.620$ | $\nu_{d8} = 36.3$ |
| $r_9 = -245.24$ | | | |
| | $d_9 = 17.96$ | $N_{d9} = 1.000$ | |
| $r_{10} = -1124.63$ | | | |
| | $d_{10} = 11.00$ | $N_{d10} = 1.490$ | $\nu_{d10} = 58.0$ |
| $r_{11} = -150.31$ | | | |
| | $d_{11} = 34.00$ | $N_{d11} = 1.000$ | |
| $r_{12} = -44.37$ | | | |
| | $d_{12} = 4.00$ | $N_{d12} = 1.489$ | $\nu_{d12} = 58.2$ |
| $r_{13} = -70.00$ | | | |
| | $d_{13} = 4.70$ | $N_{d13} = 1.437$ | $\nu_{d13} = 63.8$ |
| $r_{14} = \infty$ | | | |
| | $d_{14} = 11.33$ | $N_{d14} = 1.540$ | $\nu_{d14} = 55.0$ |
| $r_{15} = \infty$ | | | |

$r_3$: aspherical surface    $r_{11}$: aspherical surface
| | | |
|---|---|---|
| k: | 0.0000 | 0.0000 |
| $A_4$: | $-0.4271 \times 10^{-6}$ | $0.4608 \times 10^{-6}$ |
| $A_6$: | $0.2627 \times 10^{-10}$ | $0.3594 \times 10^{-9}$ |
| $A_8$: | $-0.8761 \times 10^{-13}$ | $-0.2093 \times 10^{-12}$ |
| $A_{10}$: | $0.1308 \times 10^{-16}$ | $0.1256 \times 10^{-15}$ |

$r_{12}$: aspherical surface    $r_{13}$: aspherical surface
| | | |
|---|---|---|
| k: | $-1.0000$ | $-0.5000$ |
| $A_4$: | $-0.6849 \times 10^{-6}$ | 0.0000 |
| $A_6$: | $0.5611 \times 10^{-9}$ | 0.0000 |
| $A_8$: | $-0.4159 \times 10^{-12}$ | 0.0000 |
| $A_{10}$: | $0.7521 \times 10^{-16}$ | 0.0000 | wherein the reference symbols $r_1$ through $r_{15}$ represent radii of curvature on the surfaces of the respective lens components, the reference symbols $d_1$ through $d_{14}$ represent the thickness of the respective lens components and the airspaces reserved therebetween, the reference symbols $N_{d1}$ through $N_{d14}$ signify refractive indices at the d-line, the reference symbols $V_{d1}$ through $V_{d14}$ signify Abbe numbers at the d-line, the reference symbols $A_4$, $A_6$, $A_8$, and $A_{10}$ are high-degree coefficients of asphericity, and K is a cone constant.

9. A projection lens system including seven lens elements for use in a projection television having a screen which comprises in order from the screen side:
a first lens unit composed of a positive lens element;
a second lens unit composed of an aspherical lens element made of plastic in a meniscus form having at least one aspherical surface;
a third lens unit composed of a concave lens element;
a fourth lens unit composed of a positive cemented lens doublet having a convex surface on both sides;
a fifth lens unit composed of a positive lens element made of plastic substantially in meniscus form having at least one aspherical surface; and
a sixth lens unit composed of a negative lens element which has a concave surface directed toward the screen, the sixth lens unit being made of a plastic lens substantially in meniscus form having at least one aspherical surface, wherein the system has the following numerical data:

Focal Length=93.8 mm, Magnification −0.107
Aperture ratio=1:1.09

$\Psi_{1,2} = 0.42$, $\Psi_2 = 0.07$,
$|\Psi_3| = 0.54$,
$\Psi_{4,5} = 1.28$, $\Psi_5 = 0.27$,
$|\Psi_6| = 1.22$,

| | | | |
|---|---|---|---|
| $r_1 = 133.92$ | | | |
| | $d_1 = 14.70$ | $N_{d1} = 1.606$ | $\nu_{d1} = 51.4$ |
| $r_2 = 693.10$ | | | |
| | $d_2 = 4.69$ | $N_{d2} = 1.000$ | |
| $r_3 = 78.63$ | | | |
| | $d_3 = 10.00$ | $N_{d3} = 1.490$ | $\nu_{d3} = 58.2$ |
| $r_4 = 84.88$ | | | |
| | $d_4 = 7.91$ | $N_{d4} = 1.000$ | |
| $r_5 = 845.26$ | | | |
| | $d_5 = 5.00$ | $N_{d5} = 1.717$ | $\nu_{d5} = 29.5$ |
| $r_6 = 109.23$ | | | |
| | $d_6 = 11.87$ | $N_{d6} = 1.000$ | |
| $r_7 = 83.66$ | | | |
| | $d_7 = 4.00$ | $N_{d7} = 1.717$ | $\nu_{d7} = 29.5$ |
| $r_8 = -59.04$ | | | |
| | $d_8 = 25.00$ | $N_{d8} = 1.697$ | $\nu_{d8} = 55.5$ |
| $r_9 = -146.65$ | | | |
| | $d_9 = 23.13$ | $N_{d9} = 1.000$ | |
| $r_{10} = -421.32$ | | | |
| | $d_{10} = 11.00$ | $N_{d10} = 1.490$ | $\nu_{d10} = 58.0$ |
| $r_{11} = -121.03$ | | | |
| | $d_{11} = 34.00$ | $N_{d11} = 1.000$ | |
| $r_{12} = -35.59$ | | | |
| | $d_{12} = 4.00$ | $N_{d12} = 1.489$ | $\nu_{d12} = 58.2$ |
| $r_{13} = -70.00$ | | | |
| | $d_{13} = 4.70$ | $N_{d13} = 1.437$ | $\nu_{d13} = 63.8$ |
| $r_{14} = \infty$ | | | |
| | $d_{14} = 10.30$ | $N_{d14} = 1.540$ | $\nu_{d14} = 55.0$ |
| $r_{15} = \infty$ | | | |

$r_3$: aspherical surface    $r_4$: aspherical surface
| | | |
|---|---|---|
| k: | 0.0000 | 0.0000 |
| $A_4$: | $-0.7876 \times 10^{-6}$ | $0.4768 \times 10^{-6}$ |
| $A_6$: | $-0.5155 \times 10^{-9}$ | $0.4809 \times 10^{-9}$ |
| $A_8$: | $-0.6776 \times 10^{-13}$ | $-0.3521 \times 10^{-13}$ |
| $A_{10}$: | $0.4619 \times 10^{-16}$ | $0.6055 \times 10^{-16}$ |

$r_{10}$: aspherical surface    $r_{11}$: aspherical surface
| | | |
|---|---|---|
| k: | 0.0000 | 0.0000 |
| $A_4$: | $-0.8878 \times 10^{-6}$ | $-0.4481 \times 10^{-6}$ |
| $A_6$: | $-0.6168 \times 10^{-9}$ | $-0.1800 \times 10^{-9}$ |
| $A_8$: | $0.1724 \times 10^{-13}$ | $0.3356 \times 10^{-12}$ |
| $A_{10}$: | $0.5610 \times 10^{-16}$ | $0.1390 \times 10^{-15}$ |

$r_{12}$: aspherical surface    $r_{13}$: aspherical surface
| | | |
|---|---|---|
| k: | $-1.0000$ | $-0.5000$ |
| $A_4$: | $-0.1212 \times 10^{-5}$ | 0.0000 |
| $A_6$: | $-0.2010 \times 10^{-12}$ | 0.0000 |
| $A_8$: | $-0.9898 \times 10^{-12}$ | 0.0000 |
| $A_{10}$: | $-9.2475 \times 10^{-15}$ | 0.0000 | wherein the reference symbols $r_1$ through $r_{15}$ represent radii of curvature on the surfaces of the respective lens components, the reference symbols $d_1$ through $d_{14}$ represent the thicknesses of the respective lens components and the airspaces reserved therebetween, the reference symbols $N_{d1}$ through $N_{d14}$ signify refractive indices at the d-line, the reference symbols $V_{d1}$ through $V_{d14}$ signify Abbe numbers at the d-line, the reference symbols $A_4$, $A_6$, $A_8$, and $A_{10}$ are high-degree coefficients of asphericity, and K is a cone constant.

10. A projection lens system including seven lens elements for use in a projection television having a screen which comprises in order from the screen side:
   a first lens unit composed of a positive lens element;
   a second lens unit composed of an aspherical lens element made of plastic in a meniscus form having at least one aspherical surface;
   a third lens unit composed of a concave lens element;
   a fourth lens unit composed of a positive cemented lens doublet having a convex surface on both sides;
   a fifth lens unit composed of a positive lens element made of plastic substantially in meniscus form having at least one aspherical surface; and
   a sixth lens unit composed of a negative lens element which has a concave surface directed toward the screen, the sixth lens unit being made of a plastic lens substantially in meniscus form having at least one aspherical surface, the system having the following numerical data:
   Focal Length=92.2 mm, Magnification −0.105
   Aperture ratio=1:1.07

$\Psi_{1,2} = 0.27$, $\Psi_2 = 0.28$,
$|\Psi_3| = 0.34$,
$\Psi_{4,5} = 1.30$, $\Psi_5 = 0.18$,
$|\Psi_6| = 1.17$,

| | | | |
|---|---|---|---|
| $r_1 = 71.64$ | | | |
| | $d_1 = 18.31$ | $N_{d1} = 1.589$ | $\nu_{d1} = 61.3$ |
| $r_2 = 197.89$ | | | |
| | $d_2 = 0.50$ | $N_{d2} = 1.000$ | |
| $r_3 = 91.11$ | | | |
| | $d_3 = 5.00$ | $N_{d3} = 1.490$ | $\nu_{d3} = 58.2$ |
| $r_4 = 56.97$ | | | |
| | $d_4 = 14.98$ | $N_{d4} = 1.000$ | |
| $r_5 = 1033.96$ | | | |
| | $d_5 = 5.00$ | $N_{d5} = 1.717$ | $\nu_{d5} = 29.5$ |
| $r_6 = 163.63$ | | | |
| | $d_6 = 9.09$ | $N_{d6} = 1.000$ | |
| $r_7 = 77.55$ | | | |
| | $d_7 = 31.00$ | $N_{d7} = 1.697$ | $\nu_{d7} = 55.5$ |
| $r_8 = -60.38$ | | | |
| | $d_8 = 4.00$ | $N_{d8} = 1.717$ | $\nu_{d8} = 29.5$ |
| $r_9 = -127.82$ | | | |
| | $d_9 = 20.51$ | $N_{d9} = 1.000$ | |
| $r_{10} = -157.39$ | | | |
| | $d_{10} = 6.00$ | $N_{d10} = 1.490$ | $\nu_{d10} = 58.0$ |
| $r_{11} = -98.17$ | | | |
| | $d_{11} = 32.00$ | $N_{d11} = 1.000$ | |
| $r_{12} = -35.80$ | | | |
| | $d_{12} = 4.00$ | $N_{d12} = 1.489$ | $\nu_{d12} = 58.2$ |
| $r_{13} = -55.00$ | | | |
| | $d_{13} = 4.70$ | $N_{d13} = 1.437$ | $\nu_{d13} = 63.8$ |
| $r_{14} = \infty$ | | | |
| | $d_{14} = 10.30$ | $N_{d14} = 1.540$ | $\nu_{d14} = 55.0$ |
| $r_{15} = \infty$ | | | |

| | $r_3$: aspherical surface | $r_{10}$: aspherical surface |
|---|---|---|
| k: | 0.0000 | 0.0000 |
| $A_4$: | $-0.6309 \times 10^{-6}$ | $0.2397 \times 10^{-9}$ |
| $A_6$: | $-0.1819 \times 10^{-5}$ | $0.1167 \times 10^{-8}$ |
| $A_8$: | $-0.1288 \times 10^{-5}$ | $0.1605 \times 10^{-8}$ |
| $A_{10}$: | $0.1539 \times 10^{-5}$ | $-0.2721 \times 10^{-8}$ |

| | $r_{11}$: aspherical surface | $r_{12}$: aspherical surface |
|---|---|---|
| k: | 0.0000 | −1.0000 |
| $A_4$: | $0.7099 \times 10^{-14}$ | $0.3673 \times 10^{-17}$ |
| $A_6$: | $-0.2795 \times 10^{-11}$ | $0.1352 \times 10^{-14}$ |
| $A_8$: | $-0.2790 \times 10^{-11}$ | $0.1349 \times 10^{-14}$ |
| $A_{10}$: | $0.1437 \times 10^{-11}$ | $-0.4243 \times 10^{-15}$ | wherein the reference symbols $r_1$ through $r_{15}$ represent radii of curvature on the surfaces of the respective lens components, the reference symbols $d_1$ through $d_{14}$ represent the thicknesses of the respective lens components and the airspaces reserved therebetween, the reference symbols $N_{d1}$ through $N_{d14}$ signify refractive indices at the d-line, the reference symbols $V_{d1}$ through $V_{d14}$ signify Abbe numbers at the d-line, the reference symbols $A_4$, $A_6$, $A_8$, and $A_{10}$ are high-degree coefficients of asphericity, and K is a cone constant.

11. A projection lens system including seven lens elements for use in a projection television having a screen which comprises in order from the screen side:
   a first lens unit composed of a positive lens element;
   a second lens unit composed of an aspherical lens element made of plastic in a meniscus form having at least one aspherical surface;
   a third lens unit composed of a concave lens element;
   a fourth lens unit composed of a positive cemented lens doublet having a convex surface on both sides;
   a fifth lens unit composed of a positive lens element made of plastic substantially in meniscus form having at least one aspherical surface; and
   a sixth lens unit composed of a negative lens element which has a concave surface directed toward the screen, the sixth lens unit being made of a plastic lens substantially in meniscus form having at least one aspherical surface, wherein the system has the following numerical data:
   Focal Length=91.7 mm, Magnification −0.105
   Aperture ratio=1:1.03

$\Psi_{1,2} = 0.43$, $\Psi_2 = 0.08$,
$|\Psi_3| = 0.41$,
$\Psi_{4,5} = 1.18$, $\Psi_5 = 0.18$,
$|\Psi_6| = 1.13$,

| | | | |
|---|---|---|---|
| $r_1 = 73.26$ | | | |
| | $d_1 = 13.57$ | $N_{d1} = 1.589$ | $\nu_{d1} = 61.3$ |
| $r_2 = 127.47$ | | | |
| | $d_2 = 3.38$ | $N_{d2} = 1.000$ | |
| $r_3 = 101.44$ | | | |
| | $d_3 = 5.00$ | $N_{d3} = 1.490$ | $\nu_{d3} = 58.2$ |
| $r_4 = 122.79$ | | | |
| | $d_4 = 7.65$ | $N_{d4} = 1.000$ | |
| $r_5 = 828.00$ | | | |
| | $d_5 = 5.00$ | $N_{d5} = 1.717$ | $\nu_{d5} = 29.5$ |
| $r_6 = 135.70$ | | | |
| | $d_6 = 14.52$ | $N_{d6} = 1.000$ | |
| $r_7 = 75.40$ | | | |
| | $d_7 = 25.67$ | $N_{d7} = 1.697$ | $\nu_{d7} = 55.5$ |
| $r_8 = -92.39$ | | | |
| | $d_8 = 4.00$ | $N_{d8} = 1.717$ | $\nu_{d8} = 29.5$ |
| $r_9 = -211.69$ | | | |
| | $d_9 = 25.52$ | $N_{d9} = 1.000$ | |
| $r_{10} = -3302.63$ | | | |
| | $d_{10} = 6.00$ | $N_{d10} = 1.490$ | $\nu_{d10} = 58.0$ |
| $r_{11} = -228.92$ | | | |
| | $d_{11} = 28.00$ | $N_{d11} = 1.000$ | |
| $r_{12} = -36.93$ | | | |
| | $d_{12} = 4.00$ | $N_{d12} = 1.489$ | $\nu_{d12} = 58.2$ |
| $r_{13} = -55.00$ | | | |
| | $d_{13} = 4.70$ | $N_{d13} = 1.437$ | $\nu_{d13} = 63.8$ |
| $r_{14} = \infty$ | | | |
| | $d_{14} = 10.30$ | $N_{d14} = 1.540$ | $\nu_{d14} = 55.0$ |
| $r_{15} = \infty$ | | | |

| | $r_3$: aspherical surface | $r_{10}$: aspherical surface |
|---|---|---|
| k: | 0.0000 | 0.0000 |
| $A_4$: | $-0.5089 \times 10^{-6}$ | $-0.1273 \times 10^{-9}$ |
| $A_6$: | $-0.2598 \times 10^{-5}$ | $-0.8189 \times 10^{-9}$ |
| $A_8$: | $-0.1504 \times 10^{-5}$ | $-0.9033 \times 10^{-9}$ |
| $A_{10}$: | $0.7593 \times 10^{-6}$ | $-0.1745 \times 10^{-8}$ |

| | $r_{11}$: aspherical surface | $r_{12}$: aspherical surface |
|---|---|---|
| k: | 0.0000 | −1.0000 |
| $A_4$: | $-0.2537 \times 10^{-13}$ | $0.7044 \times 10^{-17}$ |
| $A_6$: | $-0.1981 \times 10^{-11}$ | $0.1530 \times 10^{-14}$ |
| $A_8$: | $-0.1314 \times 10^{-11}$ | $0.1252 \times 10^{-14}$ |
| $A_{10}$: | $0.7887 \times 10^{-12}$ | $-0.1996 \times 10^{-15}$ | wherein the reference symbols $r_1$ through $r_{15}$ represent radii of curvature on the surfaces of the respective lens components, the reference symbols $d_1$ through $d_{14}$ represent the thicknesses of the respective lens components and the airspaces reserved therebetween, the reference symbols $N_{d1}$ through $N_{d14}$ signify refractive indices at the d-line, the reference symbols $V_{d1}$ through $V_{d14}$ signify Abbe numbers at the d-line, the reference symbols $A_4$, $A_6$, $A_8$, and $A_{10}$ are high-degree coefficients of asphericity, and K is a cone constant.

* * * * *

UNITED STATES PATENT AND TRADEMARK OFFICE
CERTIFICATE OF CORRECTION

PATENT NO. : 4,989,961

DATED : February 05, 1991

INVENTOR(S) : Takayuki Yoshioka

It is certified that error appears in the above-identified patent and that said Letters Patent is hereby corrected as shown below:

TITLE Page, item (54), change "SYSTEMS" to --SYSTEM--;

Claim 1, Column 9, Line 46, change " 1m2 " to -- 1,2 --;

Claim 2, Column 9, Line 50, after "projection" insert --lens--;

Claim 6, Column 10, Line 27, change "unit" to --unity--;

Claim 7, Column 10, Line 43, change "units" to --unit--;

Claim 8, Column 10, Line 66, change "units" to --unit--;

Claim 8, Column 11, Line 58, change "thickness" to --thinknesses--;

Claim 9, Column 11, Line 68, after "element" change " : " to -- ; --;

Signed and Sealed this

Twelfth Day of January, 1993

*Attest:*

DOUGLAS B. COMER

*Attesting Officer*    Acting Commissioner of Patents and Trademarks

UNITED STATES PATENT AND TRADEMARK OFFICE
CERTIFICATE OF CORRECTION

PATENT NO. : 4,989,961
DATED : February 05, 1991
INVENTOR(S) : Takayuki Yoshioka It is certified that error appears in the above-identified patent and that said Letters Patent is hereby corrected as shown below:

Claim 9, Column 12, Line 34, change " $r_8 = -59.04$ " to -- $r_8 = 59.04$ --;

Claim 9, Column 12, Line 47, change " 0.4768 " to -- -0.4768 --;

Claim 9, Column 12, Line 48, change " 0.4809 " to -- -0.4809 --;

Claim 9, Column 12, Line 58, change " $-0.2010 \times 10^{-12}$ " to -- $-0.2010 \times 10_{-8}$ --;

Claim 9, Column 12, Line 60, change " -9,2475 " to -- -0.2475 --; and

Claim 10, Column 13, Line 54, change " 0.2397 " to -- -0.2397 --.